US008870553B2

(12) United States Patent
Lavender et al.

(10) Patent No.: US 8,870,553 B2
(45) Date of Patent: Oct. 28, 2014

(54) FLUID WORKING MACHINE AND METHOD OF OPERATING A FLUID WORKING MACHINE

(75) Inventors: Jack Samuel Lavender, Edinburgh (GB); Michael Richard Fielding, Linlithgow (GB); Niall James Caldwell, Edinburgh (GB); Uwe Bernhard Pascal Stein, Edinburgh (GB); Stephen Michael Laird, Edinburgh (GB)

(73) Assignee: Artemis Intelligent Power Limited, Loanhead (GB)

( * ) Notice: Subject to any disclaimer, the term of this patent is extended or adjusted under 35 U.S.C. 154(b) by 576 days.

(21) Appl. No.: 13/320,837

(22) PCT Filed: Feb. 23, 2011

(86) PCT No.: PCT/GB2011/050357
§ 371 (c)(1),
(2), (4) Date: Nov. 16, 2011

(87) PCT Pub. No.: WO2011/104546
PCT Pub. Date: Sep. 1, 2011

(65) Prior Publication Data
US 2012/0060684 A1 Mar. 15, 2012

(30) Foreign Application Priority Data
Feb. 23, 2010 (GB) .................................. 1003002.1

(51) Int. Cl.
*F04B 49/03* (2006.01)
*F04B 9/04* (2006.01)
*F04B 17/02* (2006.01)
*F04B 53/10* (2006.01)

(52) U.S. Cl.
CPC ............... *F04B 53/1082* (2013.01); *F04B 9/04* (2013.01); *F04B 17/02* (2013.01)
USPC .............................. 417/442; 417/502; 91/244

(58) Field of Classification Search
USPC ............ 417/273, 442, 502; 91/236, 244, 493, 91/496, 482, 474, 497
See application file for complete search history.

(56) References Cited

U.S. PATENT DOCUMENTS 3,314,364 A * 4/1967 Green .......................... 417/506
5,190,446 A 3/1993 Rampen et al.
(Continued)

FOREIGN PATENT DOCUMENTS

DE 102007030979 8/2009
EP 1319836 6/2003
(Continued)

OTHER PUBLICATIONS

Rampen, W.H.S., Taylor, J.R.M., Riddoch, F., "Gearless transmissions for large wind turbines", DEWEK, Bremen, 2006.
(Continued)

*Primary Examiner* — Bryan Lettman
(74) *Attorney, Agent, or Firm* — Lowe Hauptman & Ham, LLP (57) ABSTRACT

A fluid working machine comprising a controller and a working chamber, an electronically controllable low pressure valve associated therewith and a fast high pressure valve associated therewith, characterized in that the working chamber has associated therewith a slow high pressure valve for controlling the connection of the working chamber to a secondary high pressure manifold. A fluid working machine according to the invention may be operated to rotate its shaft to a certain position, for example to allow easy maintenance of a wind turbine generator.

22 Claims, 4 Drawing Sheets

(56) References Cited

U.S. PATENT DOCUMENTS

| | | | |
|---|---|---|---|
| 5,259,738 A | 11/1993 | Rampen et al. | |
| 7,418,820 B2 | 9/2008 | Harvey et al. | |
| 2006/0151767 A1 | 7/2006 | Wobben | |
| 2010/0028152 A1 | 2/2010 | Numajiri et al. | |
| 2010/0084587 A1 | 4/2010 | Stein | |

FOREIGN PATENT DOCUMENTS

| | | |
|---|---|---|
| EP | 2055946 | 5/2009 |
| GB | 2459520 | 10/2009 |
| JP | H5503335 | 6/1993 |
| JP | H10339266 | 12/1998 |
| WO | 9105163 | 4/1991 |
| WO | 2004025122 | 3/2004 |
| WO | 2009153605 | 12/2009 |

OTHER PUBLICATIONS

Rampen W.H.S, Almond J.P, Taylor J.R.M, Ehsan Md. and Salter S.H, "Progress on the Development of the Wedding-cake Digital Hydraulic Pump/Motor", 2nd European Wave Power Conference, Lisbon, Nov. 8-10, 1995.

Salter, S.H., "Proposal for a Large, Vertical-Axis Tidal-Stream Generator with Ring-Cam Hydraulics", Third European Wave Energy Conference, Sep. 30-Oct. 2, 1998, Patras Greece.

* cited by examiner

FLUID WORKING MACHINE AND METHOD OF OPERATING A FLUID WORKING MACHINE

RELATED APPLICATIONS

The present application is a National Phase of International Application Number PCT/GB2011/050357, filed Feb. 23, 2011 and claims priority from, British Application Number 1003002.1, filed Feb. 23, 2010.

FIELD OF THE INVENTION

The present invention relates to a fluid working machine, a method of operating a fluid working machine and computer program code.

BACKGROUND TO THE INVENTION

In the most common positive displacement hydraulic machines the fluid chambers undergo cyclical variations in volume following a roughly sinusoidal function. It is known from EP0361927 that a chamber can be left to idle by holding an electromagnetically actuated valve, located between the working chamber and the low-pressure source, in the open condition. Thus the output of such synthetically commutated machines is varied through the action of first filling each working chamber with liquid, then deciding whether to reject the liquid back to the low-pressure source or to pump it at pressure to the output manifold. Pumping the liquid back to the low-pressure source means that a very small amount of power needs to be expended, during the time that a working chamber is idle, whilst still allowing the working chambers to become productive with a minimum latency period.

U.S. Pat. No. 4,496,847 showed a first fluid working machine (a pump) absorbing power from a renewable energy device such as a wind or tidal turbine, and a second fluid working machine driving a generator to create electricity. However, a problem is found in maintenance of the renewable energy device when it is required to rotate the shaft of the pump, since the torque required may be very high. This need may be felt during maintenance or starting of the renewable energy device for example.

The fluid working machine mentioned in the first paragraph has desirable properties of efficiency and controllability, but it cannot absorb energy from a fluid source and apply it to its shaft to rotate that shaft. EP0494236 introduced an additional operating mode and controllable valve which allows the use of the machine in a motoring cycle where torque is applied to the rotating shaft, thus allowing a controllable bi-directional energy flow. WO/2008/029073 introduced yet another operating mode and an improved valve which allows the hydraulic machine to start from stationary, which was not possible for the machine of EP0494236. However, the valve required for this machine is complicated and therefore expensive, and does not provide optimal flow for fluid working machines which are operated almost entirely as pumps.

From the above it will be appreciated that there are some applications in which it may be desirable to rotate the shaft of a fluid working machine, but where there is insufficient external torque available to do this and the fluid working machine is not capable of rotating its own shaft. It is, therefore, an object of the present invention to provide an apparatus for and method of rotating the shaft of a hydraulic pump.

SUMMARY OF THE INVENTION

In a first aspect, the invention provides a fluid working machine according to claim 1, preferred or optional features of the invention being set out in the dependent claims.

As described below in more detail, the working chambers may be mechanically coupled (for example by a cam) to a rotating shaft, linearly displaceable link or any other appropriate mechanical device, whereby a pressure differential across the working chambers may be converted into mechanical work. The invention thus provides a fluid path from the secondary high pressure manifold into the working chamber to enable the output of mechanical work (such as the driving of a shaft of the fluid working machine), while eliminating the complex, expensive, and sub-optimal valves required of machines of the prior art.

Preferably the fluid working machine comprises a rotatable shaft for cyclically driving or being cyclically driven by the working chambers. Thus, rotation of the rotatable shaft is typically coupled to cycles of working chamber volume. Preferably the shaft is an eccentric camshaft. The shaft may comprise a ring cam. The controller preferably comprises a phase input for receiving a phase signal indicative of the phase of volume cycles of working chambers of a fluid working machine. The phase signal may be received from a phase sensor, for example an optical, magnetic or inductive phase sensor. The phase sensor preferably senses the phase of the shaft and the controller may infer the working chamber phase from the sensed eccentric crankshaft phase.

The terms 'slow' and low cycle rates' should be construed as at least slower than something that is described as 'fast' or 'high cycle rates' respectively. Thus, the low cycle rates are slower than the high cycle rates and the slow high pressure valve operates more slowly than the fast high pressure valve. In more detail, preferably the fast high pressure valve is operable at speeds of at least the rated speed of the fluid working machine. Preferably high cycle rates are cycle rates of the working chambers at (or substantially near) the rated speed of the fluid working machine. It may be that the slow high pressure valve is only operable at speeds less than (and preferably substantially less than) the rated speed of the fluid working machine. Preferably low cycle rates are cycle rates of the working chambers at substantially less than the rated speed of the fluid working machine. 'Operable at' may mean able to both open and close within half a cycle of working chamber volume. 'Operable at' may mean able to open or close in substantially less than half a cycle of working chamber volume. 'Substantially less than' in this disclosure may for example mean one half of, one fifth of, one tenth of, or less. Thus, for example, the high cycles rate may be the cycle rate of the working chambers at the rated speed of the fluid working machine and the low cycles rates may be one tenth of that rate.

Preferably the fast high pressure valve is an uncontrolled valve, that is to say, one which is not under electronic control. However, the fast high pressure valve may be an actively controlled valve. It may be that the fast high pressure valve is a direct acting solenoid valve. It may be that the fast high pressure valve is not able to open against pressure.

Preferably the low pressure valve is an actively controllable valve, that is to say, one which is under electronic control of the controller. Preferably the low pressure valve has substantially more flow capacity and/or substantially more flow area than the slow high pressure valve. It may be that the low pressure valve is a direct acting solenoid valve. It may be that the low pressure valve is not able to open against pressure. It may be that the low pressure valve is a pressure-actuated or mechanically actuated valve. It may be that a plurality of low pressure valves are actuated together.

Preferably the slow high pressure valve is an actively controllable valve, that is to say, one which is under electronic control of the controller. Preferably the slow high pressure valve has substantially less flow capacity and/or substantially less flow area than the fast high pressure valve. Preferably the slow high pressure valve has substantially less flow capacity and/or substantially less flow area than the low pressure valve. It may be that the slow high pressure valve is a direct acting solenoid valve. It may be that the slow high pressure valve is able to open against pressure. It may be that the slow high pressure valve is a pressure balanced valve, or a pressure balanced solenoid valve. It may be that the slow high pressure valve is a pressure-actuated or mechanically actuated valve. It may be that a plurality of slow high pressure valves are actuated together.

Preferably the pressure in the low pressure manifold is substantially less than the pressure in either of the high pressure manifolds. Preferably the primary high pressure manifold is connected to a fluid load. Preferably the fluid load acts as a sink of high pressure fluid in use. It may be that the secondary high pressure manifold is fluidically connected to a secondary source of high pressure fluid. It may be that the secondary source supplies high pressure fluid to further devices external to the fluid working machine, in at least one configuration. Preferably the secondary source of high pressure fluid supplies high pressure fluid to a blade pitch control mechanism. It may be that the secondary source of high pressure fluid supplies high pressure fluid to the fluid load in at least one mode of operation, which might include starting the fluid load.

It may be that the primary and secondary high pressure manifolds are permanently fluidically connected (that is to say, the two manifolds may be in fluid communication). It may be that the primary and secondary high pressure manifolds are connectable in at least one configuration of the fluid working machine. It may be that the primary and secondary high pressure manifolds are coincident. It may be that the secondary high pressure manifold is isolated from the primary high pressure manifold.

Preferably the primary high pressure manifold comprises blocking means for preventing fluid from passing through said primary high pressure manifold from the working chamber when the slow valve is open to the secondary high pressure manifold. Preferably said blocking means lies between the fast high pressure valve and a fluid load connected to the high pressure manifold. It may be that said blocking means is under the control of the controller. It may be that said blocking means is manually operated or manually inserted, or it may be under the control of another controller. The blocking means may be the fast high pressure valve. The blocking means may be located remote to the fluid working machine. There may be a plurality of blocking means associated with a plurality of working chambers and a plurality of high pressure manifolds. Said blocking means may be a blocking valve, a ball valve, a blanking plate or plug.

Preferably the fluid working machine comprises a plurality of the working chambers as described. It may be that the fluid working machine comprises in addition, one or more additional working chambers of cyclically varying volume, one or more additional electronically controllable low pressure valves associated therewith, and one or more additional fast high pressure valves associated therewith. It may be that not all working chambers have associated slow high pressure valves. It may be that not all working chambers have associated fast high pressure valves.

The controller may actively control the said electronically controllable valves, in phased relationship to cycles of working chamber volume, to regulate the time-averaged displacement of the working chambers, responsive to the received demand signal.

The fluid working machine may function only as a motor, or only as a pump. Alternatively, the fluid working machine may function as either a motor or a pump in alternative operating modes.

Preferably, each working chamber is operable on each cycle of working chamber volume to carry out an active cycle in which the chamber makes a net displacement of working fluid or an idle cycle in which the chamber makes substantially no net displacement of working fluid. It may be that each working chamber is operable to displace one of a plurality of volumes of working fluid (for example, a range of volumes of working fluid) during an active cycle. The said range of volumes may be discontinuous, for example, the range of volumes of working fluid may comprise a range extending from a first minimum of substantially no net fluid displacement, to a first maximum of at most 25% or 40% of the maximum net fluid displacement of a working chamber, and then from a second minimum of at least 60% or 75% of the maximum net fluid displacement of a working chamber, to a second maximum in the region of 100% of the maximum net fluid displacement of a working chamber. This may occur where, for example, the operating working fluid pressure is sufficiently high that it is not possible to open or close valves in the middle of expansion or contraction strokes of working chamber volume, or the fluid flow is sufficiently high that operating with a continuous range of volumes would be damaging to the working chamber, the valves of the working chamber, or other parts of the fluid working machine.

By "actively control" we refer to enabling the controller to affect the state of a valve, in at least some circumstances, by a control mechanism which consumes power and is not exclusively a passive response, for example, the opening or closing of a valve responsive solely to the pressure difference across a valve. Related terms such as "active control" should be construed accordingly. Nevertheless, the low pressure valve, and one or more other valves where present, are preferably also operable to open or close by passive means. The low pressure valve typically opens passively due to the drop in pressure within the working chamber, such as during an intake stroke. For example, the low pressure valve, or one or more other valves, where present, may, during at least some cycles, open passively due to a pressure difference and be selectively closable under the active control of the controller during a portion of the cycle.

Preferably the valves are also biased open or biased closed by a biasing means. Preferably the valves are moveable from a first position to a second position under active control, and movable from the second position to the first position by the biasing means. Preferably one of the first or second positions is a closed position, and the other is an opened position.

By "actively control" (and related terms such as "active control") we include the possibilities that the controller is operable to selectively cause a valve to do one or more of open, close, remain open and/or remain closed. The controller may only be able to affect the state of a valve during a portion of a working cycle. For example, the controller may be unable to open the low pressure valve against a pressure difference during the majority of a working cycle when pressure within the working chamber is substantial. Typically, the controller actively controls the low pressure valve and the slow high pressure valve, by transmitting a control signal either directly to a valve or to a valve driver, such as a semiconductor switch.

By transmitting a control signal, we include transmitting a signal which denotes the intended state of a valve (e.g. open or closed) or a pulse which denotes that the state of a valve should be changed (e.g. that the valve should be opened or closed), or a pulse which denotes that the state of a valve should be maintained. The controller may transmit a signal on a continuous basis and stop or change the signal to cause a change in the state of a valve, for example, the low pressure valve, or one or more other valves, may comprise a normally closed solenoid opened valve which is held open by provision of an electric current and actively closed by switching off the current.

By "in phased relationship to cycles of working chamber volume" we mean that the timing of active control by the controller of the low pressure valve, and one or more other valves, where present, is determined with reference to the phase of the volume cycles of the working chamber. Accordingly, the fluid working machine typically comprises working chamber phase determining means, such as a position sensor. For example, where the cycles of working chamber volume are mechanically linked to the rotation of a shaft, the fluid working machine preferably comprises a shaft position sensor, and optionally a shaft speed sensor, and the controller is operable to receive a shaft position signal from the shaft position sensor, and optionally a shaft speed signal from a said shaft speed sensor. In embodiments which comprise a plurality of working chambers, with a phase difference between the volume cycles of different working chambers, the controller will typically be operable to determine the phase of individual working chambers.

Preferably, when the demand indicated by a received demand signal is sufficiently low, one or more working chambers operable to displace fluid to carry out the working function is redundant during one or more cycles of working chamber volume, that is to say, if the working chamber was not present or was not operating, the fluid-working machine could anyway displace sufficient fluid to meet the demand without changing the overall frequency of active cycles of working chamber volume.

Preferably, when the demand indicated by the received demand signal is sufficiently low, the selected volume of fluid displaced by at least one of the working chambers which are available to carry out the working function is substantially zero for at least some cycles of working chamber volume. In some embodiments, when the demand indicated by the received demand signal is sufficiently low, at least one of the working chambers which are available to carry out the working function carries out an idle cycle for at least some cycles of working chamber volume. In some embodiments, wherein the working chambers are operable to displace one of a plurality of volumes of working fluid, when the demand indicated by the received demand signal is sufficiently low, the selected volume of fluid displaced by at least one of the working chambers which are available to carry out the working function is less than the maximum volume of working fluid which the said at least one of the working chambers is operable to displace.

In some embodiments, a single slow high pressure valve is provided for each working chamber. However, it may be that each slow high pressure valve controls the connection of a plurality of working chambers to the secondary high pressure manifold. Thus, a plurality of working chambers may have the same slow high pressure valve associated therewith.

In some embodiment, each slow high pressure valve may control the connection of one or more working chambers to the secondary high pressure manifold through a check valve and a fluid line extending from the check valve to the slow high pressure valve. In this case, the check valve typically opens directly into the working chamber. The check valve is preferably immediately adjacent to the working chamber. The check valve is openable by a pressure in the fluid line extending from the check valve to the slow high pressure valve which exceeds the pressure within the working chamber, and closable by a pressure in the fluid line extending from the check valve to the slow high pressure valve which is less than the pressure within the working chamber. The check valve may be biased closed by a resilient biasing member.

The received demand signal may indicate a desired volume of working fluid to be displaced (e.g. received or output) to fulfil a working function. The received demand signal may indicate a desired output or input pressure. The received demand signal may indicate a desired rate to displace fluid to fulfil a working function. A fluid response sensor may be provided to monitor a property of received or output fluid, for example, the pressure of received or output fluid, or the rate of displacement of received or output fluid, and to provide a fluid response signal. The controller may compare the fluid response signal and the received demand signal to select the volume of working fluid displaced by one or more said working chambers on each cycle of working chamber volume, for example to perform closed loop control.

In some embodiments the fluid working machine may comprise at least one demountable blade coupled to the rotatable shaft. Preferably said at least one demountable blade is a blade of an energy extraction device of which the fluid working machine is part. Preferably said energy extraction device is a wind turbine generator (WTG) or tidal energy device. Preferably the fluid load is a hydraulic motor coupled to a generator, for generating electricity. Preferably said at least one demountable blade is a controllable blade, which is variable in shape or pitch angle in use.

The invention extends in a second aspect to a method of controlling a fluid working machine according to the first aspect. Preferably the slow high pressure valve is opened to drive the expansion of the working chamber. Preferably the low pressure valve is closed when the slow high pressure valve is opened to drive the expansion of the working chamber. Preferably the slow high pressure valve is opened near the beginning of the expansion phase of the working chamber, to cause the desired rotation of the shaft of the fluid working machine. Preferably the slow high pressure valve is closed before the end of the expansion of the working chamber, and preferably sufficiently far before the end of the expansion of the working chamber to allow the working chamber to depressurise before reaching its maximum volume.

It may be that the method comprises mounting or demounting at least one counterweight in place of at least one said first or second blades. It may be that the method employs a plurality of counterweights which are attached in place of the same or different blades in turn. It may be that each of a plurality of counterweights has a different mass, which may be mounted or demounted in ascending or descending order.

The invention extends in a third aspect to fluid-working machine (1) comprising a controller (12) and a working chamber (2) of cyclically varying volume, the working chamber having an electronically controllable low pressure valve (14) associated therewith to control the connection of the working chamber to a low pressure manifold (16), the controller being operable to actively control the low pressure valve, in phased relationship to cycles of working chamber volume, to determine the net displacement of fluid by the working chamber on a cycle by cycle basis, the working chamber having a first high pressure valve (20) associated therewith for controlling the connection of the working chamber to a primary high pressure manifold (22) in a normal pumping mode of the fluid working machine, characterised in that the working chamber has associated therewith a second high pressure valve (30) for controlling the connection of the working chamber to a source of high pressure fluid (32) to thereby drive expansion of the working chamber volume in an alternative motoring mode of the fluid working machine.

The invention extends in a fourth aspect to a method of operating a fluid working machine comprising a controller (12) and a working chamber (2) of cyclically varying volume, the working chamber having an electronically controllable low pressure valve (14) associated therewith to control the connection of the working chamber to a low pressure manifold (16), the controller being operable to actively control the low pressure valve, in phased relationship to cycles of working chamber volume, to determine the net displacement of fluid by the working chamber on a cycle by cycle basis, the working chamber having a first high pressure valve (18) associated therewith for controlling the connection of the working chamber to a primary high pressure manifold (20) in a normal pumping mode of the fluid working machine, characterised in that the working chamber has associated therewith a second high pressure valve (24) for controlling the connection of the working chamber to a source of high pressure fluid (26) and the method comprises, in an alternative motoring mode of the fluid working machine, opening said second high pressure valve to thereby drive the expansion of the working chamber.

In the third and fourth aspects of the invention, the first high pressure valve is typically a relatively fast high pressure valves and the second high pressure valve is typically a relative slow high pressure valve. Further optional features of the first and second high pressure valves correspond to those discuss above in relation to the fast high pressure valve and the slow high pressure valve. The normal pumping mode is typically a mode which takes place at high cycle rates and the alternative motoring mode is typically a mode which takes place at low cycle rates. The said source of high pressure fluid may be a high pressure manifold, such as a secondary high pressure manifold.

The invention extends in a fifth aspect to computer program code which, when executed on a fluid working machine controller, operates the fluid working machine according to any of the methods described with reference to any one of the first, second, third or fourth aspect. The invention also extends to a computer readable carrier (such as a memory, or magnetic or optical storage device) storing computer program code according to the fifth aspect of the invention.

The invention extends in a sixth aspect to a method of maintaining or inspecting an energy extraction device comprising a fluid working machine according to the first aspect, wherein the method comprises rotating the shaft of the fluid working machine according to the second or fourth aspect and mounting or demounting blades, or accessing the energy extraction device, or conducting an inspection of the device.

In some embodiments in which demountable blades are present, the method may comprise rotating the shaft of the fluid working machine to the first predetermined angle, by the opening of at least one slow high pressure valve. The method may comprise mounting or demounting at least one first said blade at the first predetermined angle. The method may comprise mounting or demounting at least one first said blade at the first predetermined angle followed by opening and closing a plurality of slow high pressure valves under the control of the controller to drive the rotation of said shaft to a second predetermined angle. Preferably the first predetermined angle corresponds to a position of increased access to the at least one first demountable blade. Preferably the first predetermined angle corresponds to a position of safe access for the inspection or maintenance of the fluid working machine. Preferably the second predetermined angle corresponds to a position of increased access to at least one second demountable blade. There may be third, fourth and subsequent predetermined positions with respective mountings or demountings of blades and easy access. A predetermined angle may be a range of acceptable angles. The rotation may be controlled by the control of the fluid pressure or flow in the secondary high pressure manifold, or by the closing of the slow high pressure valves.

The present invention may at least in part extend to a suitably programmed controller operable to receive input data regarding the state of the system (for example including a demand signal relating to an activation of the system, for example to cause the system to step through cycles of operation so as convert a pressure differential into mechanical work on a connected part of the system), to process the input data, and to output control signals to aforementioned valves in dependence on the processing.

Preferred and optional features of the second through sixth aspects correspond to those described for the first aspect. Further variations and modifications may be made within the scope of the invention, as will present themselves to those skilled in the art.

DESCRIPTION OF THE DRAWINGS

An example embodiment of the present invention will now be illustrated with reference to the following Figures in which.

DETAILED DESCRIPTION OF AN EXAMPLE EMBODIMENT

Figure 1:
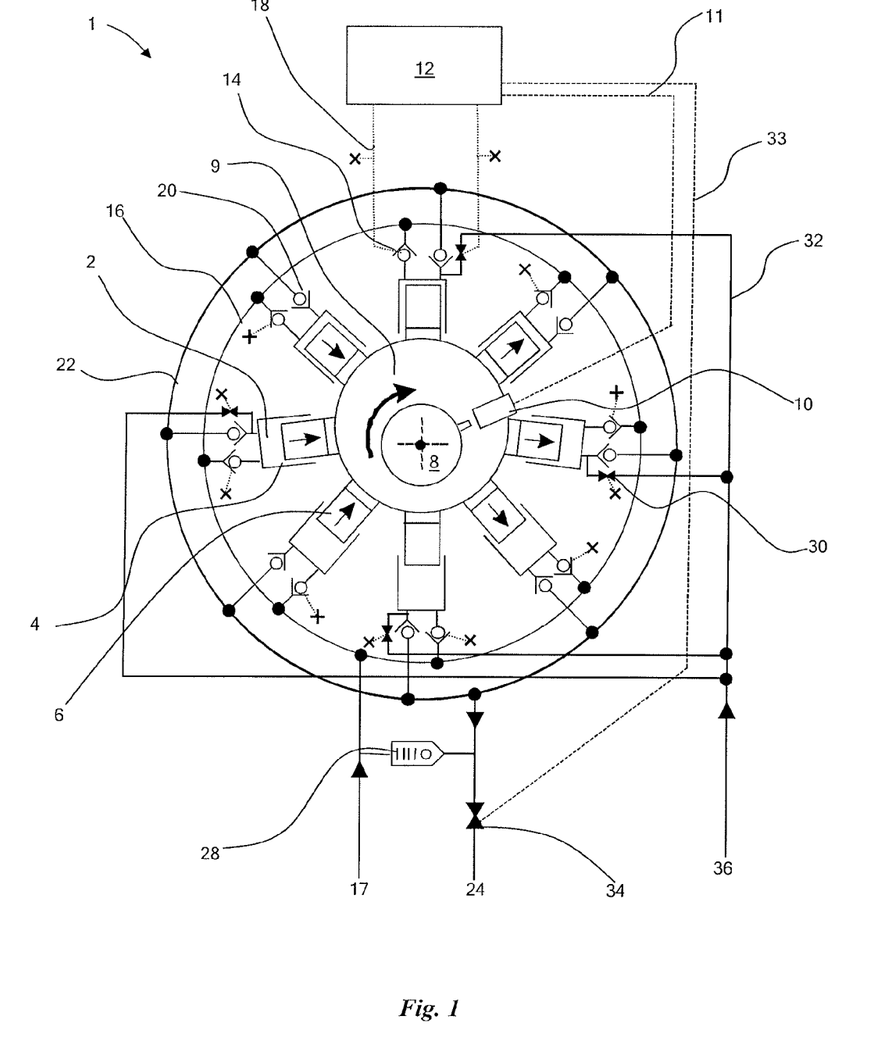
FIG. 1 shows an embodiment of a fluid working machine according to the first aspect of the invention.

FIG. 1 illustrates a fluid working machine in the form of an electronically commutated hydraulic pump/motor 1 comprising a plurality of working chambers 2 which have volumes defined by the interior surface of cylinders 4 and pistons 6 which are driven from a rotatable crankshaft 8 by an eccentric cam 9 and which reciprocate within the cylinders to cyclically vary the volume of the working chambers. A shaft position and speed sensor 10 determines the instantaneous angular position and speed of rotation of the shaft, and through signal line 11 informs a controller 12, which enables the controller to determine the instantaneous phase of the cycles of each working chamber. The controller is typically a microprocessor or microcontroller which executes a stored program in use.

The working chambers are each associated with Low Pressure Valves (LPV) in the form of electronically actuated face-sealing poppet valves 14, which face inwards toward their associated working chamber and are operable to selectively seal off a channel extending from the working chamber to a low pressure manifold 16, which functions generally as a net source or sink of fluid in use and may connect one or several working chambers, or indeed all as is shown here, to a reservoir (not shown) through a low pressure port 17. The LPVs are normally open solenoid closed valves which open passively when the pressure within the working chamber is less than the pressure within the low pressure manifold, i.e. during an intake stroke, to bring the working chamber into fluid communication with the low pressure manifold, but are selectively closable under the active control of the controller via LPV control lines 18 (connections are implied by X's in most cases to simplify the diagram) to bring the working chamber out of fluid communication with the low pressure manifold. Alternative electronically controllable valves may be employed, such as normally closed solenoid opened valves.

The working chambers are each further associated with High Pressure Valves (HPV) 20 in the form of pressure actuated delivery valves (acting as the fast high pressure valve). The HPVs face outwards from the working chambers and are operable to seal off a channel extending from the working chamber to a primary high pressure manifold 22, which functions as a net source or sink of fluid in use and which may connect one or several working chambers, or indeed all as is shown here, to a primary high pressure port 24 leading to a fluid load (not shown). The HPVs function as normally-closed pressuring-opening check valves which open passively when the pressure within the working chamber exceeds the pressure within the primary high pressure manifold. The HPVs could also, in a slightly different embodiment, function as normally-closed solenoid opened check valves which the controller may selectively hold open once that HPV is opened by pressure within the associated working chamber. A pressure relief valve 28 may protect the fluid working machine from damage.

In addition, every second working chamber is equipped with a blocking valve 30 (acting as the slow high pressure valve) which is controllable by the controller (connections are implied by X's in most cases to simplify the diagram). The blocking valve is operable to seal off a channel extending from the working chamber to a secondary high pressure manifold 32 which functions as a source of high pressure fluid in use. The blocking valve is operable under the control of the controller by control line 33 to open when there is pressure in the secondary high pressure manifold, but not in the working chamber, but has a low flow capacity. For example, the flow capacity is around the intake flow rate of the working chamber when it is working at one tenth of the nominal RPM of the eccentric cam 9. An isolating valve 34 (acting as the blocking means) controlled by the controller 12 connects or isolates the fast high pressure valves from the fluid load, while the secondary high pressure manifold has a secondary high pressure port 36 leading to a secondary hydraulic pump (not shown, but acting as the independent source).

In a normal mode of operation described in the prior art, the controller closes one or more of the LPVs near the point of maximum volume in the associated working chamber cycle, closing the path to the low pressure manifold and thereby directing fluid out through the associated HPV on the subsequent contraction stroke. The controller chooses the number and sequence of LPV closures to produce a flow or create a shaft torque to satisfy a received demand. As well as determining whether or not to close or hold open the LPVs on a cycle by cycle basis in the manner of the prior art, the controller is operable to vary the precise phasing of the closure of the LPVs with respect to the varying working chamber volume. Arrows on the ports 17,24 indicate fluid flow in the pumping mode. The blocking valves of the invention are closed throughout this mode of operation, while the isolating valve is open.

In a further, maintenance, operating mode according to the second aspect of the invention, which mode is entered when it is desired to rotate the fluid working machine's now stationary shaft without the benefit of an external torque, the isolating valve 34 is closed while, only for those working chambers 2 which would be in the expansion phase of their cycle during rotation in the desired direction, the blocking valves 30 are opened and the LPVs 14 are closed. For those working chambers 2 which are in the contraction phase of their cycle during rotation in the desired direction, the blocking valves 30 are closed and the LPVs 14 are opened. The secondary hydraulic pump provides pressurised fluid to the working chambers 2 through the open blocking valves 30 and the secondary high pressure manifold 32, causing the rotation of the eccentric cam 9. The primary high pressure manifold 22 is arranged to be pressurised, or fluid will anyway pass from the working chamber through the fast high pressure valves until it is pressurised. The controller monitors the speed sensor 10 and arranges to open and close the blocking valves and LPVs to maintain the rotation as the working chambers expand and contract, according the rule just described.

There are several ways to arrange for the primary high pressure manifold to be pressurised. It may be that the isolating valve 34 is a manually controlled valve, for example a quarter turn valve. In a particularly advantageous embodiment, the hydraulic motor is able to be configured to block fluid, trapping pressurised fluid in the primary high pressure manifold. The fluid connection between the hydraulic motor and the primary high pressure manifold could be broken and capped. The hydraulic motor or a connection thereto could incorporate a self-sealing connection, for example a bayonet on the hydraulic motor or connection thereto could open a check valve which would otherwise seal the primary high pressure manifold.

Figure 2:
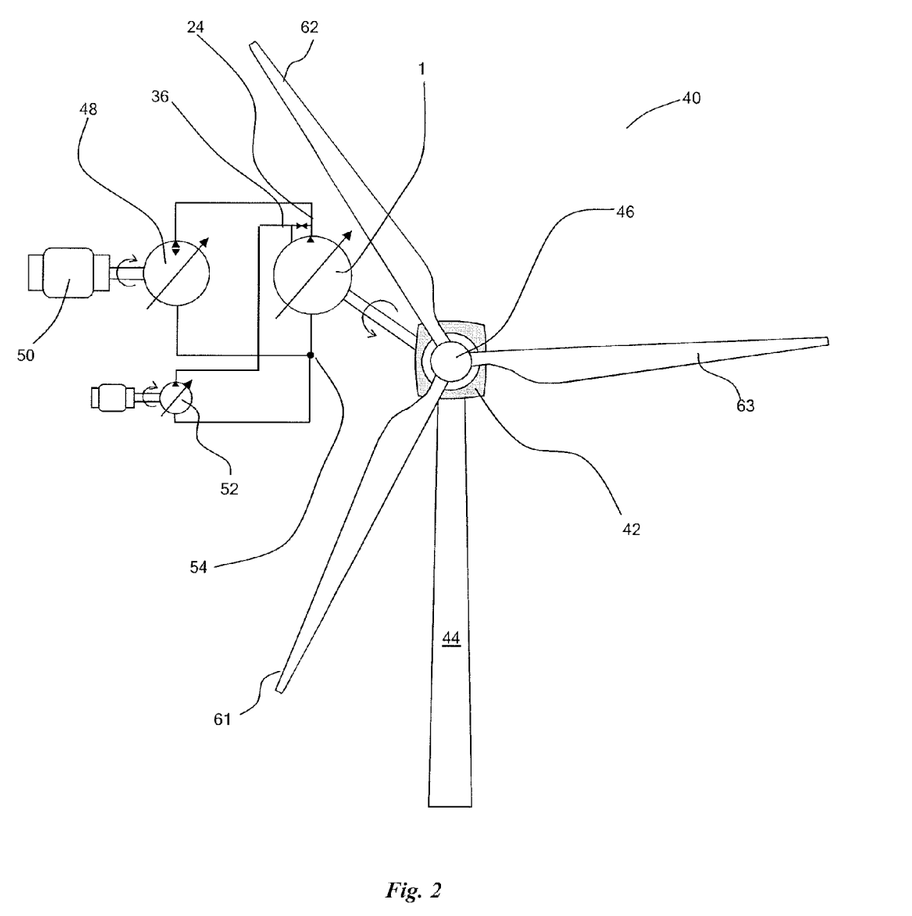
FIG. 2 shows a Wind Turbine Generator (WTG) employing a fluid working machine according to the first aspect of the invention.

FIG. 2 illustrates a Wind Turbine Generator (WTG) 40 (acting as the energy extraction device) comprising a nacelle 42 mounted on top of a tower 44. The nacelle has attached thereto a hub 46 and contains the fluid working machine 1 shown earlier in FIG. 1 but shown here schematically for ease of explanation, the fluid working machine being driven by the hub 46 and driving via primary high pressure port 24 a hydraulic motor 48. The motor 48 itself drives a generator 50 providing electrical power to a distribution network (not shown). The nacelle also contains the secondary hydraulic pump 52 which connects to the secondary high pressure port 36 of the fluid working machine 1 and shares a common low pressure connection 54 with the fluid working machine 1 and the hydraulic motor 48. Blades 61, 62, 63 are attached to the hub but are demountable blades and may be detached therefrom. The pitch of the blades, rotation of the nacelle, or other functions may be driven by the secondary hydraulic pump.

In embodiments where the primary and secondary high pressure manifolds are coincident or connectable (via a connecting valve) the hydraulic motor 48 may be used as a pump to provide the secondary high pressure manifold with fluid pressure to rotate the shaft. In such a machine the secondary hydraulic pump 52 may not be necessary, or may be desirable as a backup supply of high pressure fluid.

Figure 3:
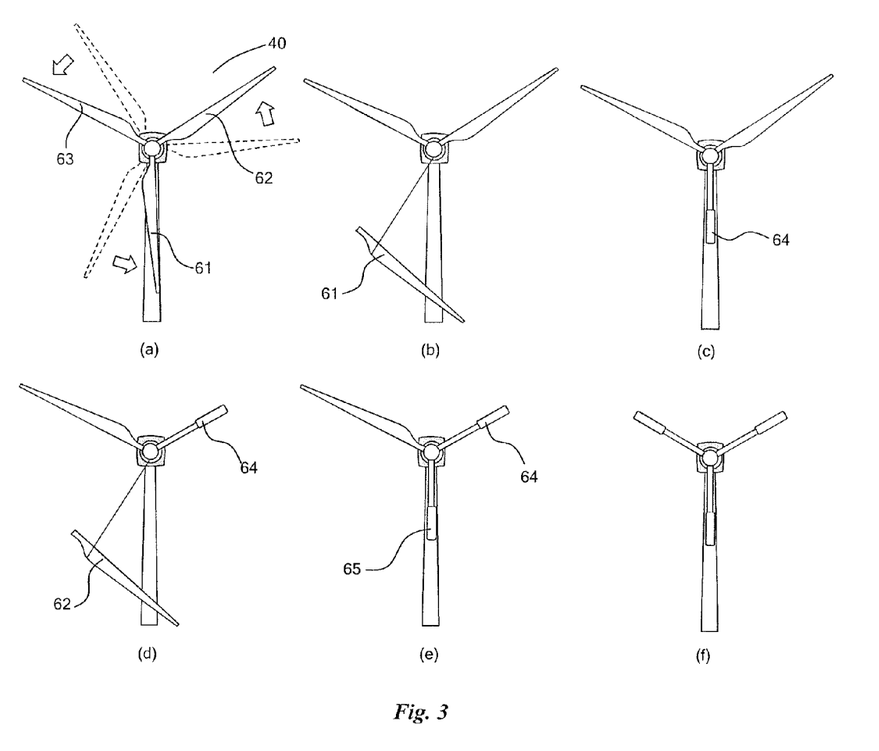
FIG. 3 shows a maintenance operation on a WTG employing the method of the fourth aspect of the invention.

FIG. 3 illustrates a method of maintaining the WTG of FIG. 2 using the fourth aspect of the invention. In FIG. 3*a* the wind turbine is prepared for maintenance by the controller using the slow high pressure valves and fluid from the secondary high pressure manifold to slowly rotate the hub to the position where first blade 61 is points down and second blade 62 and third blade 63 are around 30 degrees from horizontal. This is a safe configuration for the landing of a helicopter or dropping of an engineer onto the nacelle, for example. Of course other orientations may be desirable depending on the design of the WTG and the maintenance procedures. A mechanical safety brake may be applied when the blades are in the required orientations.

In FIG. 3b the first blade 61 is shown being lowered to the ground, in this case by a winch cable extended from the hub (preferably extending from near the centre of the rotor attachment point) although a crane may be employed. The blade may be lowered from the horizontal orientation, instead of the vertical as shown.

In FIG. 3c the first blade is replaced by a first counterweight 64, which may be lifted into place in the reverse of the winching or craning procedure used to demount the first blade. The purpose of the counterweight is to balance the weight on the hub 46 so that the torque thereon is not too high for the fluid working machine 1 to rotate it to the next desired position.

In FIG. 3d the hub has been rotated so that the second blade 62 is in the demounting position, and the second blade is demounted. FIG. 3e shows that a second counterweight 65 is attached, while FIG. 3f shows all the blades demounted and counterweights mounted. The procedure could be repeated again, this time demounting the first through third counterweights and mounting lighter counterweights or simply removing the first through third counterweights.

Figure 4:
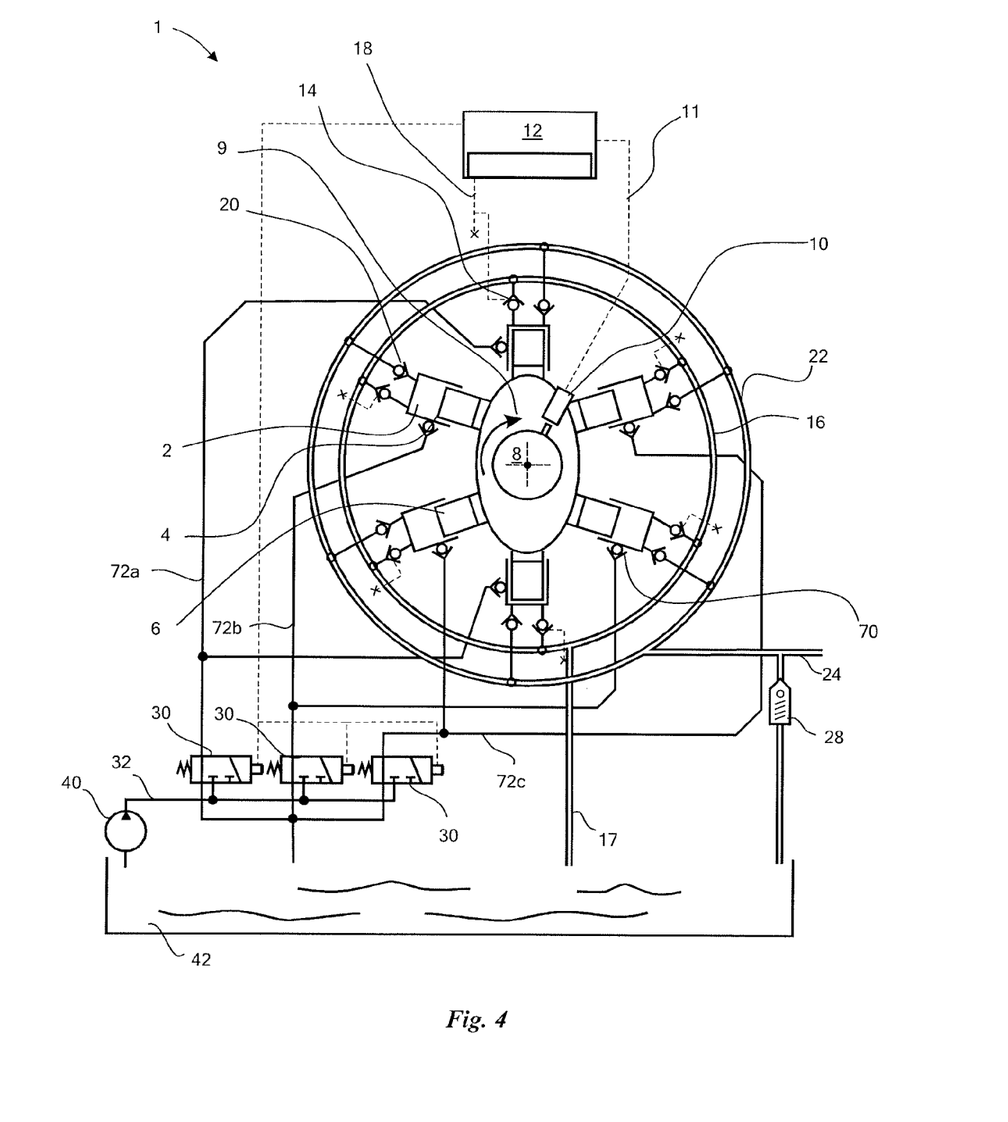
FIG. 4 shows an alternative embodiment of a fluid working machine according to the invention.

An alternative embodiment of the invention is illustrated in FIG. 4, in which corresponding parts have been numbered with the same label. In this case, each working chamber has a secondary valve 30 (functioning as a slow high pressure valve) associated with it, but also an additional pressurised fluid delivery valve 70 which is a passively opening check valve that opens directly into the respective working chamber. The additional pressure fluid delivery valves are each connected to a secondary valve by way of a driving line 72a, 72b, 72c. More than one passively opening check valve is connected to each driving line so that a secondary valve can regulate the flow of pressurised fluid to a plurality of working chambers, however, each secondary valve is connected, through a driving line 72a, 72b or 72c and passively opening check valves, to working chambers which are in the same phase as each other. For example, in a machine with four banks of chambers, where the first and third bank of chambers are at the same phase as each other and the second and fourth bank of chambers are at the same phase as each other, one secondary valve could supply fluid to corresponding working chambers in the first and third banks and optionally another could supply fluid to corresponding working chambers in the second and fourth banks. Each secondary valve regulates the flow of working fluid to the plurality of working chambers to which it is connected by placing the respective driving line in fluid communication with the secondary high pressure manifold 32, which is pressurised by way of a pump 40, or the low pressure fluid tank 42, under the control of the controller. The tank also supplies low pressure fluid to the low pressure manifold 16 and is connected through a pressure relief valve 28 to the primary high pressure manifold 22.

During normal operation of the pump, the secondary valves are in their default state such that the driving lines are at the pressure of the low pressure tank and so the additional pressurised fluid delivery valves remain shut. They remain closed because, during normal operation, either the low pressure fluid which is delivered to the working chambers during the expansion stroke of a pumping cycle is at a slightly higher pressure than the driving line (i.e. tank pressure), for example 5 bar versus 1 bar, or because they are biased closed. However, it would be possible for a machine to be provided in which the additional pressurised fluid delivery valve operated as a secondary source of low pressure fluid for the working chambers.

In a maintenance operating mode, the fluid working machine controller opens at least some of the secondary valves, in particular those which control the supply of pressurised fluid to working chambers which are at a phase corresponding with their intake stroke. Thus, pressurised fluid is supplied through the additional pressurised fluid delivery valves to working chambers such as to drive the rotation of the shaft, albeit at a relatively low angular speed compared to the rated angular speed during normal operation. The high pressure manifold 24 must be maintained at pressure at least as high as the secondary high pressure manifold 32 pressure during this operating mode.

This arrangement has the advantages that relatively few controlled slow high pressure valves are required and the additional pressurised fluid delivery valves can be located very close to the working chambers and therefore introduce only minimal dead volume to the working chambers.

The torque that is applied can be varied by, for example, adjusting the displacement of the pump 40 to regulate the pressure in the secondary high pressure manifold, or by adjusting the number of open secondary valves, or by using the secondary valves to regulate the range of phases of the cycles of working chamber volume in which the secondary high pressure manifold is in communication with the working chambers. It is not necessary for each working chamber to have an additional pressurised fluid delivery valve and connection to a driving line. For example, only every second working chamber, or only some banks of working chambers in a multi-bank machine, may be connectable to a driving line.

In this embodiment, the pump is illustrated with a double eccentric, although one skilled in the art will appreciate that the invention may be put into effect with alternative arrangements, for example, the working chambers may be coupled to a multi-lobed ring cam.

Further modifications and variations falling within the scope of the invention will present themselves to those knowledgeable of the art.

The invention claimed is:

1. A fluid working machine comprising a controller and a working chamber of cyclically varying volume, the working chamber having an electronically controllable low pressure valve associated therewith to control the connection of the working chamber to a low pressure manifold, the controller being operable to actively control the low pressure valve, in phased relationship to cycles of working chamber volume, to determine the net displacement of fluid by the working chamber on a cycle by cycle basis, the working chamber having a fast high pressure valve associated therewith for controlling the connection of the working chamber to a primary high pressure manifold at high cycle rates, characterised in that the working chamber has associated therewith a slow high pressure valve for controlling the connection of the working chamber to a secondary high pressure manifold at low cycle rates.

2. The fluid working machine of claim 1 wherein the controller is operable to actively control the slow high pressure valve during a portion of at least some cycles of working chamber volume.

3. The fluid working machine of claim 1 wherein the fast high pressure valve is a pressure operated check valve.

4. The fluid working machine of claim 1 wherein the controller is operable to actively control the fast high pressure valve during a portion of at least some cycles of working chamber volume.

5. The fluid working machine of claim 1 wherein the high pressure valves are openable and closable in phased relationship to cycles of working chamber volume under the control of the controller.

6. The fluid working machine of claim 1 wherein the slow high pressure valve is of substantially lower flow capacity than the fast high pressure valve.

7. The fluid working machine of claim 1 wherein the slow high pressure valve is operable to open against elevated fluid pressure within the secondary high pressure manifold compared to the pressure in the working chamber.

8. The fluid working machine of claim 1, wherein each slow high pressure valve controls the connection of a plurality of working chambers to the secondary high pressure manifold.

9. The fluid working machine of claim 1, wherein each slow high pressure valve controls the connection of one or more working chambers to the secondary high pressure manifold through a check valve and a fluid line extending from the check valve to the slow high pressure valve.

10. The fluid working machine of claim 1 wherein the primary and secondary high pressure manifolds are fluidically connected.

11. The fluid working machine of claim 1 wherein the primary high pressure manifold comprises blocking means for preventing fluid from passing through said primary high pressure manifold from the working chamber when the slow high pressure valve is open to the secondary high pressure manifold.

12. The fluid working machine of claim 1 further comprising at least one working chamber having a low pressure valve and fast high pressure valve associated therewith, but not having a slow high pressure valve associated therewith.

13. The fluid-working machine according to claim 1, wherein each working chamber is operable on each cycle of working chamber volume to carry out an active cycle in which the chamber makes a net displacement of working fluid or an idle cycle in which the chamber makes substantially no net displacement of working fluid.

14. A method of operating a fluid working machine comprising a controller and a working chamber of cyclically varying volume, the working chamber having an electronically controllable low pressure valve associated therewith to control the connection of the working chamber to a low pressure manifold, the controller being operable to actively control the low pressure valve, in phased relationship to cycles of working chamber volume, to determine the net displacement of fluid by the working chamber on a cycle by cycle basis, the working chamber having a fast high pressure valve associated therewith for controlling the connection of the working chamber to a primary high pressure manifold at high cycle rates, characterised in that the working chamber has associated therewith a slow high pressure valve for controlling the connection of the working chamber to a secondary high pressure manifold at low cycle rates, and that the method comprises opening said slow high pressure valve to drive the expansion of the working chamber.

15. The method of claim 14 further comprising supplying the secondary high pressure manifold from an independent source of high pressure hydraulic fluid.

16. The method of claim 14 further comprising opening and closing a plurality of slow high pressure valves under the control of the controller to drive the rotation of a shaft of the fluid working machine to a first predetermined angle.

17. The method of claim 16 wherein said shaft has coupled thereto a plurality of demountable blades, wherein the method comprises mounting or demounting at least one first said blade, followed by or preceded by opening and closing a plurality of slow high pressure valves under the control of the controller to drive the rotation of said shaft to a second predetermined angle.

18. The method of claim 16 wherein the method comprises mounting or demounting at least one counterweight in place of at least one said blades.

19. The method of claim 18 wherein the method comprises replacing at least one said counterweight with at least one said blades.

20. Computer program code which, when executed on a fluid working machine controller, operates a fluid working machine according to the method of claim 14.

21. A fluid-working machine comprising a controller and a working chamber of cyclically varying volume, the working chamber having an electronically controllable low pressure valve associated therewith to control the connection of the working chamber to a low pressure manifold, the controller being operable to actively control the low pressure valve, in phased relationship to cycles of working chamber volume, to determine the net displacement of fluid by the working chamber on a cycle by cycle basis, the working chamber having a first high pressure valve associated therewith for controlling the connection of the working chamber to a primary high pressure manifold in a normal pumping mode of the fluid working machine, characterised in that the working chamber has associated therewith a second high pressure valve for controlling the connection of the working chamber to a source of high pressure fluid to thereby drive expansion of the working chamber volume in an alternative motoring mode of the fluid working machine.

22. A method of operating a fluid working machine comprising a controller and a working chamber of cyclically varying volume, the working chamber having an electronically controllable low pressure valve associated therewith to control the connection of the working chamber to a low pressure manifold, the controller being operable to actively control the low pressure valve, in phased relationship to cycles of working chamber volume, to determine the net displacement of fluid by the working chamber on a cycle by cycle basis, the working chamber having a first high pressure valve associated therewith for controlling the connection of the working chamber to a primary high pressure manifold in a normal pumping mode of the fluid working machine, characterised in that the working chamber has associated therewith a second high pressure valve for controlling the connection of the working chamber to a source of high pressure fluid and the method comprises, in an alternative motoring mode of the fluid working machine, opening said second high pressure valve to thereby drive the expansion of the working chamber.

* * * * *